United States Patent
Kühne et al.

(10) Patent No.: US 11,409,104 B2
(45) Date of Patent: Aug. 9, 2022

(54) METHOD AND SYSTEM FOR OPERATING AT LEAST TWO DISPLAY DEVICES CARRIED BY RESPECTIVE VEHICLE OCCUPANTS ON THE HEAD

(71) Applicant: AUDI AG, Ingolstadt (DE)

(72) Inventors: Marcus Kühne, Beilngries (DE); Nils Wollny, Munich (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/267,083

(22) PCT Filed: May 21, 2019

(86) PCT No.: PCT/EP2019/063014
§ 371 (c)(1),
(2) Date: Feb. 9, 2021

(87) PCT Pub. No.: WO2020/030312
PCT Pub. Date: Feb. 13, 2020

(65) Prior Publication Data
US 2021/0311308 A1 Oct. 7, 2021

(30) Foreign Application Priority Data
Aug. 10, 2018 (DE) ...................... 10 2018 213 556.8

(51) Int. Cl.
*G02B 27/01* (2006.01)
*H04N 13/344* (2018.01)
*G06F 3/01* (2006.01)

(52) U.S. Cl.
CPC .......... *G02B 27/017* (2013.01); *G06F 3/012* (2013.01); *H04N 13/344* (2018.05);
(Continued)

(58) Field of Classification Search
CPC .... H04N 13/344; G02B 27/017; G06F 3/012; B60K 2370/111; B60K 2370/563;
(Continued)

(56) References Cited

U.S. PATENT DOCUMENTS 9,703,369 B1 * 7/2017 Mullen ................. A63F 13/843
2015/0269780 A1 * 9/2015 Herman ................. A63F 13/26
345/633

(Continued)

FOREIGN PATENT DOCUMENTS

DE 10 2012 017 700 A1 3/2014
DE 10 2014 015 871 A1 4/2016
(Continued)

OTHER PUBLICATIONS

Translation by WIPO dated Feb. 11, 2021 of International Preliminary Report on Patentability for International Application No. PCT/EP2019/063014, 7 pages.
(Continued)

*Primary Examiner* — Christopher E Leiby
(74) *Attorney, Agent, or Firm* — Staas & Halsey LLP

(57) ABSTRACT

Data characterizing a relative arrangement of vehicle occupants with respect to one another are continuously transmitted to display devices worn on the heads of the vehicle occupants. Virtual environments are displayed as a function of these data.

19 Claims, 1 Drawing Sheet

(52) U.S. Cl.
CPC ... *B60K 2370/111* (2019.05); *B60K 2370/177* (2019.05); *B60K 2370/182* (2019.05); *B60K 2370/1868* (2019.05); *B60K 2370/563* (2019.05)

(58) Field of Classification Search
CPC ...... B60K 2370/182; B60K 2370/1868; B60K 2370/177
See application file for complete search history.

(56) References Cited

U.S. PATENT DOCUMENTS

| | | | |
|---|---|---|---|
| 2016/0238692 A1* | 8/2016 | Hill | G06F 3/14 |
| 2017/0166221 A1* | 6/2017 | Osterman | B60W 50/14 |
| 2018/0005429 A1 | 1/2018 | Osman et al. | |
| 2018/0040163 A1* | 2/2018 | Donnelly | G06F 3/017 |
| 2018/0189555 A1* | 7/2018 | Satake | G06F 3/011 |
| 2018/0253905 A1* | 9/2018 | McCracken | A63F 13/245 |
| 2018/0308454 A1* | 10/2018 | Gusikhin | G02B 27/017 |
| 2019/0004598 A1* | 1/2019 | Gordt | G06F 3/012 |
| 2019/0020844 A1* | 1/2019 | Teixeira | G09B 7/02 |
| 2020/0053400 A1* | 2/2020 | Chao | H04W 4/021 |
| 2020/0079215 A1* | 3/2020 | Thurimella | G10L 15/22 |
| 2021/0188088 A1* | 6/2021 | Kuehne | G06T 3/40 |
| 2021/0205712 A1* | 7/2021 | Kuhne | A63F 13/213 |
| 2021/0311547 A1* | 10/2021 | Kuehne | B60K 35/00 |

FOREIGN PATENT DOCUMENTS

| | | |
|---|---|---|
| DE | 10 2015 014 450 A1 | 5/2017 |
| DE | 10 2016 224 122 A1 | 6/2018 |
| DE | 10 2018 213 556.8 | 8/2018 |
| DE | 10 2017 208 936 A1 | 11/2018 |
| WO | 2017/157589 A1 | 9/2017 |
| WO | PCT/EP2019/063014 | 5/2019 |

OTHER PUBLICATIONS

German Office Action dated Jul. 31, 2019 from German Application No. 10 2018 213 556.8, 12 pages.
International Search Report dated Jul. 30, 2019 from International Application No. PCT/EP2019/063014, 4 pages.
European Office Action dated Feb. 25, 2022 from European Application No. 19725971.6, 7 pages.

* cited by examiner

METHOD AND SYSTEM FOR OPERATING AT LEAST TWO DISPLAY DEVICES CARRIED BY RESPECTIVE VEHICLE OCCUPANTS ON THE HEAD

CROSS REFERENCE TO RELATED APPLICATIONS

This application is a U.S. national stage of International Application No. PCT/EP2019/063014, filed on May 21, 2019. The International Application claims the priority benefit of German Application No. 10 2018 213 556.8 filed on Aug. 10, 2018. Both the International Application and the German Application are incorporated by reference herein in their entirety.

BACKGROUND

Described below are a method and a system for operating at least two display devices worn on the head by respective vehicle occupants.

In the future, route-dependent virtual reality experiences, using which vehicle occupants can experience different virtual events during travel while wearing augmented reality glasses or also virtual reality glasses, will highly probably become established in vehicles at latest from the increased use of autonomously driving vehicles.

The use of augmented reality glasses and also virtual reality glasses as such is already known from the related art. Thus, for example DE 10 2015 014 450 A1 discloses virtual reality glasses and a method for operating virtual reality glasses. The virtual reality glasses include a first display device for displaying a virtual environment for a wearer of the virtual reality glasses, wherein a second display device is attached to an outside of the virtual reality glasses in order to display the same virtual environment for a person standing on the outside as the wearer of the virtual reality glasses has displayed.

DE 10 2014 015 871 A1 discloses a display system for a motor vehicle and a method for operating such a display system. The display system may include augmented reality glasses which are worn by a driver of the motor vehicle, and virtual reality glasses which are worn by a front passenger of the motor vehicle.

DE 10 2012 017 700 A1 discloses a system and a method for simulating an operation of a nonmedical tool. Data glasses are used here to display a virtual environment for a wearer of the data glasses, wherein a display device is used to display an image of the wearer within the virtual environment.

SUMMARY

Described below is a method by which at least two display devices worn on the head by respective vehicle occupants can be operated particularly well adapted to one another. According to this method for operating at least two display devices worn on the head by respective vehicle occupants, respective virtual environments are displayed by the display devices. During this, data characterizing a relative arrangement of the vehicle occupants with respect to one another are continuously transmitted to the display devices and the virtual environments are displayed as a function of these data.

The display devices worn on the head can be, for example, augmented reality glasses, augmented reality contact lenses, or also virtual reality glasses. The method enables synchronization of the content of in-car virtual reality experiences. Since many journeys with motor vehicles will very probably also take place in community in the future, in particular in the case of autonomously driving vehicles, a supply of mechanisms for providing shared experiences is very useful. Against this background, the method enables a shared synchronous experience of virtual environments in the motor vehicle.

It is thus possible, for example, that the at least two vehicle occupants who wear the display device on the head jointly experience something cooperative or also competitive in the form of the respective displayed virtual environment. For this purpose, a permanent information exchange takes place between the employed display devices worn on the head, in that data characterizing a relative arrangement of the vehicle occupants with respect to one another are continuously transmitted to the respective display devices and the virtual environments are displayed as a function of these data.

The display devices themselves can include, for example, sensors or other detecting devices, by which an alignment and positioning of the respective display devices can be ascertained. These data can be transmitted to the respective other display device in order to continuously ascertain the respective relative arrangement of the vehicle occupants in relation to one another and to display the virtual environment as a function thereof. It is also possible, for example that sensors installed in the respective vehicles are used to ascertain a relative positioning of the vehicle occupants with respect to one another, so that data in this regard can be continuously transmitted to the relevant display devices. It is thus possible that at least two vehicle occupants wear one of the display devices on the head, by which respective virtual environments are displayed, wherein the displayed virtual environments are synchronized with one another with respect to content, above all with regard to the relative arrangement of the vehicle occupants with respect to one another. It is fundamentally unimportant here whether the vehicle occupants are seated in the same vehicle or in different vehicles.

One advantageous embodiment provides that respective head movements of the vehicle occupants are continuously detected by respective detection devices and are transmitted as part of the data to the display devices, wherein the detected head movements determine a respective virtual perspective of the vehicle occupants on the respective virtual environments. Thus, if the vehicle occupants each rotate their heads, the respective virtual perspective of the relevant vehicle occupants on the respective displayed virtual environments therefore changes. The vehicle occupants can thus influence the perspective from which they wish to view the respective virtual environments in a simple manner.

A further advantageous embodiment provides that if the vehicle occupants are located in different vehicles, a relative movement of the vehicles with respect to one another is detected and transmitted as part of the data to the display devices, wherein the detected relative movement determines a respective virtual perspective of the vehicle occupants on the respective virtual environments. The vehicle occupants seated or arranged in different vehicles can thus, for example, experience a virtual car race game or a virtual space battle or the like jointly as a virtual experience. Depending on how the different vehicles move with respect to one another, the respective virtual perspective of the vehicle occupants on the respective virtual environments changes. The vehicle occupants seated in the different vehicles can thus, for example, play a particularly realistically appearing car race game, and can—if this also takes place with the vehicles in reality—also mutually overtake one another, for example with their virtual vehicles or virtual space planes or the like, and may also appear within the virtual environment. Alternatively, it is also possible that the vehicle occupants are located in the same vehicle, wherein in this case only the relative movements of the vehicle occupants with respect to one another within the same vehicle are detected and taken into consideration in the display of the respective virtual environment.

One alternative advantageous embodiment provides that if the vehicle occupants are located in different vehicles, respective relative movements of the vehicle occupants with respect to respective vehicle interiors are detected and transmitted as part of the data to the display devices, wherein the detected relative movements determine a respective virtual perspective of the vehicle occupants on the respective virtual environments and a relative movement of the vehicles with respect to one another remains unconsidered. It could thus be, for example that the two vehicle occupants who are seated in different vehicles share a virtual experience with one another in which the relative movement of the different vehicles with respect to one another would not be relevant at all and the implementation of which would even be disturbing. In this case, it is particularly advantageous if simply only respective relative movements of the vehicle occupants with respect to respective vehicle interiors of the different vehicles are detected, in which the respective vehicle occupants are presently seated, so that these detected relative movements exclusively determine respective virtual perspectives of the vehicle occupants on the respective virtual environments. For example, if one of the vehicle occupants in the relevant vehicle leans to the right, he thus also leans to the right within the virtual environment. It is unimportant here how the vehicle in which this vehicle occupant is seated is presently moving in relation to the other vehicle in which the other vehicle occupant is seated.

In a further advantageous embodiment, it is provided that respective avatars of the respective other vehicle occupants are displayed as part of the virtual environments by the display devices in accordance with the relative arrangement of the vehicle occupants with respect to one another within the virtual environments. The vehicle occupants can thus see respective virtual representations of the respective other vehicle occupant in the form of the avatars within the respective virtual environment. If both vehicle occupants are seated in the same vehicle next to one another, for example, a respective avatar of the relevant vehicle occupant is thus located in the respective displayed virtual environment on the left or right, respectively, of a virtual position of the respective other vehicle occupant within the respective displayed virtual environment. The vehicle occupants can thus very easily experience something cooperative or competitive with one another within the virtual environment, for example.

A further advantageous embodiment provides that respective head movements of the vehicle occupants are detected and converted into corresponding head movements of the avatars. The vehicle occupants can thus, by way of corresponding head movements, cause the respective avatars in the virtual environments to pivot their head to the left and right, for example precisely like the vehicle occupants in reality. It is thus possible, for example, that the vehicle occupants can mutually look at one another and also turn away from one another within the virtual environment by way of their respective avatars.

In a further advantageous embodiment, it is provided that inputs of a further person on a user interface are detected and the virtual environments are adapted in accordance with the detected inputs. It is thus possible, for example, for persons standing on the outside without virtual reality glasses or also augmented reality glasses to influence the virtual experience for the other vehicle occupants. The outsider can thus, for example, change the virtual experience for the vehicle occupants and, for example, adapt an upcoming route section recognizable to them, as a result of which a virtual route section is also adapted accordingly. Very generally, an outsider can thus externally influence respective virtual experiences of the vehicle occupants who wear the display device on the head. The outsider is thus also incorporated in a certain form into the virtual experience and a type of socially shared experience results. For example, a vehicle-side user interface, in particular a touch screen or the like, is used here as the user interface. Alternatively, it is also possible that a mobile terminal, in particular a smart phone, a tablet computer, or a smart watch, is used as the user interface. Thus, for example smart devices of vehicle occupants can be used or also an interaction element in one of the vehicles, for example an infotainment touchscreen.

The system for operating at least two display devices worn on the head by respective vehicle occupants is configured to carry out the method according to the invention or an advantageous embodiment of the method.

Further advantages, features, and details result from the following description of exemplary embodiments and on the basis of the drawing. The features and feature combinations mentioned above in the description and the features and feature combinations mentioned hereinafter in the description of the figures and/or shown solely in the figures are usable not only in the respective specified combination, but also in other combinations or alone, without leaving the scope of the invention.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION

Figure 1:
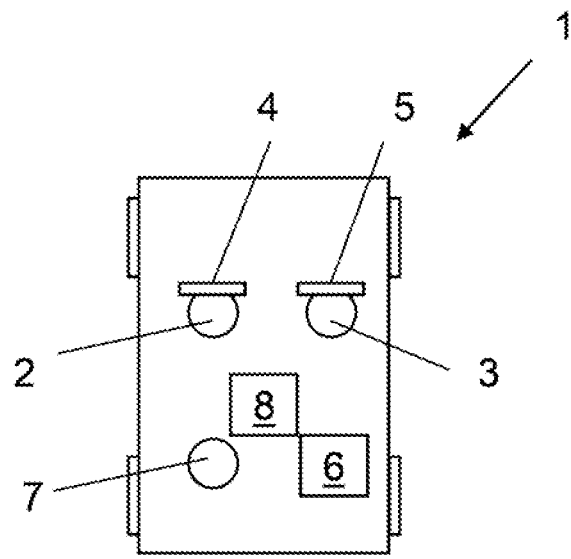
FIG. 1 is a schematic illustration of a motor vehicle in which two vehicle occupants each wearing virtual reality glasses are seated, wherein moreover a system is provided which enables a synchronization of the content of the virtual environment displayed by the virtual reality glasses.

Reference will now be made in detail to the exemplary embodiments which are illustrated in the accompanying drawings, wherein like reference numerals refer to like elements throughout.

In the figures, identical or functionally identical elements have been provided with the same reference signs.

A motor vehicle 1 is shown in a very schematic illustration in FIG. 1. Two vehicle occupants 2, 3, who have put on respective virtual reality glasses 4, 5, are seated in the motor vehicle 1. Reference is always made in conjunction with this figure and also the other figure to virtual reality glasses, wherein the explanation hereinafter can also apply, for example, to augmented reality glasses, augmented reality contact lenses, and the like. Moreover, a system 6 is provided in the motor vehicle 1, which is used for operating the two virtual reality glasses 4, 5. Contrary to the present illustration, the system 6 can also be formed solely by the two pairs of virtual reality glasses 4, 5, which in this case may communicate wirelessly with one another and can thus exchange data with one another.

Respective virtual environments are displayed by the virtual reality glasses 4, 5. During this, a relative arrangement of the vehicle occupants 2, 3 with respect to one another is ascertained continuously, wherein data in this regard are transmitted to the system 6 or also transmitted directly to the respective virtual reality glasses 4, 5. The virtual environments displayed by the virtual reality glasses 4, 5 are displayed as a function of the detected relative arrangement of the vehicle occupants 2, 3.

Thus, for example respective head movements of the vehicle occupants 2, 3 can be continuously detected, for example by the virtual reality glasses 4, 5, and transmitted to the respective virtual reality glasses 4, 5 or to the system 6. The respective detected head movements determine in this case a respective virtual perspective of the vehicle occupants 2, 3 on the respective virtual environments which are displayed by the virtual reality glasses 4, 5.

As a component of the virtual environment, respective avatars of the respective other virtual occupants 2, 3 can also be displayed by the virtual reality glasses 4, 5 in accordance with the relative arrangement of the vehicle occupants 2, 3 with respect to one another within the virtual environment. The two vehicle occupants 2, 3 can thus mutually see one another in the respective displayed virtual environments in the form of avatars and can interact with one another, for example. In this context, it can also be provided that respective head movements of the vehicle occupants 2, 3 are detected and converted into corresponding head movements of the avatars. It is thus possible, for example, that the two vehicle occupants 2, 3 can look at one another or also turn away from one another in the form of the respective avatars in the respective displayed virtual environments.

Moreover, it is possible that inputs from a further vehicle occupant 7, who has not put on virtual reality glasses, are also detected, wherein the virtual environments which are displayed by the virtual reality glasses 4, 5 are adapted in accordance with the detected inputs of the further person 7. The vehicle occupant 7 can input his inputs relating to the virtual environments at a user interface 8. The user interface 8 can be, for example, a touchscreen in the motor vehicle 1. Alternatively, it is also possible that the user interface 8 is a smart device, for example in the form of a smart watch, a smart phone, a tablet computer, or the like. The further vehicle occupant 7, without himself wearing virtual reality glasses, can thus socially interact with the further vehicle occupants 2, 3, who have put on the virtual reality glasses 4, 5, namely in that he performs certain inputs which influence the respective virtual experience of the vehicle occupants 2, 3. The further person 7 can also be arranged outside the motor vehicle 1, in order to make these inputs, for example via his smart phone.

Figure 2:
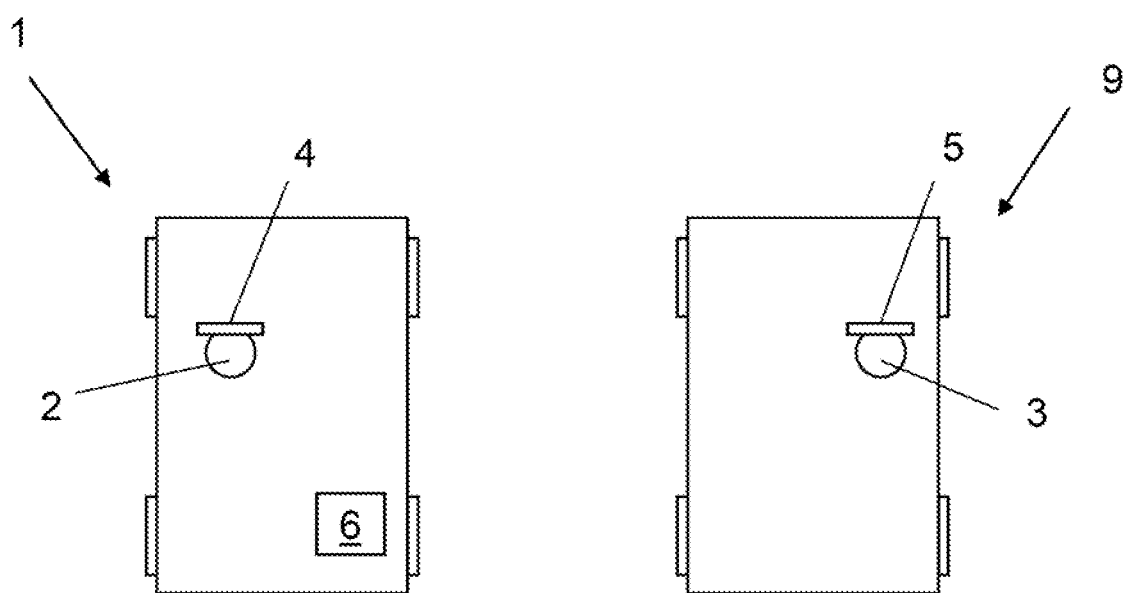
FIG. 2 is a schematic illustration of two motor vehicles, wherein a vehicle occupant wearing virtual reality glasses is seated in each case in the respective motor vehicle and the system is provided, for example, in one of the motor vehicles.

Two motor vehicles 1, 9 are shown in FIG. 2, wherein one vehicle occupant 2, 3, who has put on virtual reality glasses 4, 5, is seated in each of the motor vehicles 1, 9. In contrast to the exemplary embodiment shown in FIG. 1, it is provided here that the vehicle occupants 2, 3 are thus seated in different motor vehicles 1, 9 but also jointly share a virtual experience, in that respective virtual environments are again displayed by the virtual reality glasses 4, 5, wherein data characterizing a relative arrangement of the vehicle occupants 2, 3 with respect to one another are continuously transmitted during this between the virtual reality glasses 4, 5 and the virtual environments are displayed as a function of these data. If, as shown here, the vehicle occupants 2, 3 are located in different motor vehicles 1, 9, a relative movement of the motor vehicles 1, 9 with respect to one another can be detected and transmitted as part of the data to the respective virtual reality glasses 4, 5. The detected relative movement of the motor vehicles 1, 9 with respect to one another determines a respective virtual perspective of the vehicle occupants 2, 3 on the respective virtual environments in this case.

It is thus possible, for example, that the vehicle occupants 2, 3 seated in the different motor vehicles 1, 9 jointly play a virtual car race or the like. If the motor vehicles 1, 9 pass one another in reality, for example they are controlled fully autonomously, it can thus be provided that the vehicle occupants 2, 3 see respective avatars of the respective other vehicle occupant 2, 3 in the displayed virtual environment who are arranged in corresponding virtual motor vehicles. It is also conceivable that the vehicle occupants 2, 3 start a car race jointly proceeding from a virtual starting point independently of the precise positioning of the motor vehicles 1, 9, wherein the relative movement of the motor vehicles 1, 9 with respect to one another is then also taken into consideration.

Alternatively, it is also possible that only respective relative movements of the vehicle occupants 2, 3 with respect to the respective vehicle interiors of the motor vehicles 1, 9 are detected and exchanged between the virtual reality glasses 4, 5. The detected relative movements determine a respective perspective of the vehicle occupants 2, 3 on the respective virtual environments which are displayed by the virtual reality glasses 4, 5. A relative movement of the motor vehicles 1, 9 with respect to one another remains unconsidered. The vehicle occupants 2, 3 seated in the different motor vehicles 1, 9 can thus also, for example, share a common virtual experience, during which the relative movement of the motor vehicles 1, 9 with respect to one another remains unconsidered. It is solely decisive here how the vehicle occupants 2, 3 move in relation to the respective vehicle interiors of the motor vehicles 1, 9. For example, if the vehicle occupant 2 bends to the right and the vehicle occupant 3 bends to the left, this can thus have the result in the virtual environment that the two vehicle occupants 2, 3 mutually approach one another within the virtual environment, independently of the relative movement of the motor vehicles 1, 9.

Contrary to the present description, it is in turn also possible that a further vehicle occupant 7 can have an influence on the respective virtual environments, which are displayed by the virtual reality glasses 4, 5, via a user interface 8—as described in conjunction with FIG. 1.

It becomes clear on the basis of the explained exemplary embodiments how a synchronization of the content of various in-car virtual reality experiences can take place and moreover how an influence of the content can take place by inputs of a person 7 who has not put on virtual reality glasses or augmented reality glasses.

A description has been provided with particular reference to exemplary embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A method for operating at least two display devices respectively worn on heads of vehicle occupants in at least one transportation vehicle traveling on public roads between different locations, comprising:
    displaying respective virtual environments by the at least two display devices in the at least one transportation vehicle; and
    continuously transmitting during the displaying, data characterizing a relative arrangement of the vehicle occupants with respect to one another, to the at least two display devices, the virtual environments being displayed as a function of the data.

2. The method according to claim 1,
    further comprising detecting respective head movements of the vehicle occupants by respective detection devices,
    wherein the data transmitted to the at least two display devices indicate the respective head movements of the vehicle occupants, and
    wherein the displaying relies on the respective head movements to determine respective virtual perspectives of the vehicle occupants in the respective virtual environments.

3. The method according to claim 2,
    further comprising, when the vehicle occupants are located in different vehicles, detecting a relative movement of the different vehicles on the public roads with respect to one another,
    wherein the data transmitted to the at least two display devices indicate the relative movement of the different vehicles, and
    wherein the displaying relies on the relative movement of the different vehicles to determine the respective virtual perspectives of the vehicle occupants in the respective virtual environments.

4. The method according to claim 3,
    further comprising, when the vehicle occupants are located in different vehicles, detecting respective relative movements of the vehicle occupants with respect to respective vehicle interiors,
    wherein the data transmitted to the at least two display devices indicate the respective relative movements of the vehicle occupants, and
    wherein the displaying relies on the respective relative movements of the vehicle occupants in combination with the relative movement of the different vehicles to determine the respective virtual perspectives of the vehicle occupants in the respective virtual environments.

5. The method according to claim 4, wherein the displaying displays avatars of at least one of the vehicle occupants as a component of the respective virtual environments by the at least two display devices in accordance with the relative arrangement of the vehicle occupants with respect to one another within the respective virtual environments.

6. The method according to claim 5, wherein the displaying converts the respective head movements of the vehicle occupants into corresponding head movements of the avatars.

7. The method according to claim 6,
    further comprising detecting inputs of a person at a user interface, and
    wherein the displaying adapts the virtual environments in accordance with the inputs.

8. The method according to claim 7, wherein a vehicle-side user interface with a touchscreen is the user interface.

9. The method according to claim 7, wherein one of a smart phone, a tablet computer and a smart watch is the user interface.

10. The method according to claim 1,
    further comprising, when the vehicle occupants are located in different vehicles, detecting a relative movement of the vehicles with respect to one another on the public roads,
    wherein the data transmitted to the at least two display devices indicate the relative movement of the vehicles, and
    wherein the displaying relies on the relative movement of the vehicles to determine the respective virtual perspectives of the vehicle occupants in the respective virtual environments.

11. The method according to claim 10,
    further comprising, when the vehicle occupants are located in different vehicles, detecting respective relative movements of the vehicle occupants with respect to respective vehicle interiors,
    wherein the data transmitted to the at least two display devices indicate the respective relative movements of the vehicle occupants, and
    wherein the displaying relies on the respective relative movements of the vehicle occupants in combination with the relative movement of the different vehicles to determine the respective virtual perspectives of the vehicle occupants in the respective virtual environments.

12. The method according to claim 1, wherein the displaying displays avatars of at least one of the vehicle occupants as a component of the respective virtual environments by the at least two display devices in accordance with the relative arrangement of the vehicle occupants with respect to one another within the respective virtual environments.

13. The method according to claim 12, wherein the displaying converts the respective head movements of the vehicle occupants into corresponding head movements of the avatars.

14. The method according to claim 1,
    further comprising detecting inputs of a person at a user interface, and
    wherein the displaying adapts the virtual environments in accordance with the inputs.

15. A system located in at least one transportation vehicle traveling on public roads between different locations, comprising:
    at least two displays worn on respective heads of vehicle occupants of the at least one transportation vehicle;
    at least one communication interface coupled to the at least two displays; and
    at least one processor, coupled to the communication interface, configured to
        continuously receive data, characterizing a relative arrangement of the vehicle occupants, via the communication interface, and
        cause the at least two display device to display, while the data is received, respective virtual environments as a function of the data.

16. The system according to claim 15,
    wherein the at least two displays are configured to detect respective head movements of the vehicle occupants, and transmit, to the at least one processor via the communication interface, information representing the respective head movements of the vehicle occupants, and wherein the at least one processor is further configured to determine respective virtual perspectives of the vehicle occupants in the respective virtual environments.

17. The system according to claim 15, wherein the at least two displays are located in different vehicles, and wherein the at least one processor is further configured to determine the respective virtual perspectives of the vehicle occupants in the respective virtual environments based on respective relative movements of the different vehicles traveling on the public roads.

18. The system according to claim 17, wherein the at least two displays are located in different vehicles, and wherein the at least one processor is further configured to determine the respective virtual perspectives of the vehicle occupants in the respective virtual environments based on respective relative movements of vehicle occupants in the different vehicles and relative movements of the different vehicles traveling on the public roads.

19. The system according to claim 15, wherein one of the at least two displays, at least one communication interface and at least one processor are incorporated in each of at least two modified-reality glasses.

* * * * *